(12) United States Patent (10) Patent No.: US 8,644,561 B2
Burry et al. (45) Date of Patent: Feb. 4, 2014

(54) LICENSE PLATE OPTICAL CHARACTER RECOGNITION METHOD AND SYSTEM

(75) Inventors: Aaron Michael Burry, Ontario, NY (US); Vladimir Kozitsky, Rochester, NY (US); Peter Paul, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 221 days.

(21) Appl. No.: 13/352,554

(22) Filed: Jan. 18, 2012

(65) Prior Publication Data

US 2013/0182910 A1 Jul. 18, 2013

(51) Int. Cl.
*G06K 9/00* (2006.01)
(52) U.S. Cl.
USPC ........................................................ 382/107
(58) Field of Classification Search
USPC ................... 382/100–107; 348/113, 169–171
See application file for complete search history.

(56) References Cited

U.S. PATENT DOCUMENTS

| | | |
|---|---|---|
| 6,374,240 B1 | 4/2002 | Walker et al. |
| 6,473,517 B1 | 10/2002 | Tyan et al. |
| 6,982,654 B2 | 1/2006 | Rau et al. |
| 7,825,829 B2 | 11/2010 | Madsen |
| 8,009,870 B2 | 8/2011 | Simon |
| 8,059,868 B2 | 11/2011 | Matsumoto et al. |

OTHER PUBLICATIONS

Keysers, D., et al., "Deformation Models for Image Recognition," *IEEE Transactions on Pattern Analysis and Machine Intelligence* (200) 29(8): 1422-1435.
Khalifa, O, et al, "Malaysian Vehicle License Plate Recognition," *The International Arab Journal of Information Technology* (2007) 4(4):359-364.
Nilsson, M. et al., "Face Detection Using Local SMQT Features and Split up SNoW Classifier," *IEEE International Conference on Acoustics, Speech, and Signal Processing* (2007) ICASSP, Apr. 15-20, Honolulu, HI, 4 pages.
Otsu's method—Wikipedia, printed Dec. 2, 2011, 3 pages.
Tavares, D. M. et al., "Tesseract OCR: A Case Study for License Plate Recognition in Brazil," *Minerva* (2003) 7(1):19-26.
Tesseract-ocr—An OCR Engine that was developed at HP Labs between 1985 and 1995 . . . and now at Google.—Google Project Hosting, http://code.google.com/p/tesseract-ocr/, printed Dec. 5, 2011, 2 pages.

*Primary Examiner* — Atiba O Fitzpatrick
(74) *Attorney, Agent, or Firm* — Kermit D. Lopez; Luis M. Ortiz; Ortiz & Lopez, PLLC

(57) ABSTRACT

A method and system for recognizing a license plate character utilizing a machine learning classifier. A license plate image with respect to a vehicle can be captured by an image capturing unit and the license plate image can be segmented into license plate character images. The character image can be preprocessed to remove a local background variation in the image and to define a local feature utilizing a quantization transformation. A classification margin for each character image can be identified utilizing a set of machine learning classifiers each binary in nature, for the character image. Each binary classifier can be trained utilizing a character sample as a positive class and all other characters as well as non-character images as a negative class. The character type associated with the classifier with a largest classification margin can be determined and the OCR result can be declared.

20 Claims, 8 Drawing Sheets

LICENSE PLATE OPTICAL CHARACTER RECOGNITION METHOD AND SYSTEM

TECHNICAL FIELD

Embodiments are generally related to ALPR (Automatic License Plate Recognition) systems and methods. Embodiments are also related to image processing systems and methods. Embodiments are additionally related to the automatic recognition of license plate characters.

BACKGROUND OF THE INVENTION

ALPR (Automatic License Plate Recognition) is an image-processing approach that often functions as the core module of "intelligent" transportation infrastructure applications. License plate recognition techniques, such as ALPR, can be employed to identify a vehicle by automatically reading a license plate utilizing image processing and character recognition technologies. A license plate recognition operation can be performed by locating a license plate in an image, segmenting the characters in the captured image of the plate, and performing an OCR (Optical Character Recognition) operation with respect to the characters identified.

In general, an OCR engine can be optimized for performance with respect to a document having a uniform substrate (often the 'paper') with known or unknown characters. The substrate (the 'plate' background) of the license plate, however, is quite non-uniform due to noise with a constrained set of characters and fonts. Hence, the OCR engine optimized for document OCR is not optimum for the license plate OCR. The task of recognizing characters on the license plate is particularly difficult due to a number of challenging noise sources, for example, highly non-uniform backgrounds, touching or partially occluding objects (e.g. license plate frames), excessive shadows, and generally poor image contrast. Such noises present a much more challenging OCR problem than that typically seen in standard document scanning applications.

Most prior art ALPR approaches do not meet all of the performance demands of, for example, transportation businesses and enterprises. Several OCR technologies have been tested utilizing sample tolling images provided from an actual tolling installation. In one prior art implementation, for example, an image distortion model (IDM) nearest neighbor (NN) data driven (DD) classifier was used to implement an OCR engine. The performance of this OCR method is correlated highly to a training set size and can be quite sensitive to how well centered the segmented characters are in the input images. As such, it was found that the performance is improved somewhat by supplementing the training set with characters that are shifted variants of an original set.

In another prior art implementation, a Tesseract OCR engine algorithm breaks up edges of characters, both external and internal, into features with orientation, length, and direction. Starting with a topmost character edge pixel, the algorithm traverse along the edge pixels until the direction changes more than 45 degrees from a starting point at which point the features is saved and a new feature is created. This process is repeated until all the edge pixels are mapped to a unique feature. A classifier can be employed to map the test character features to those contained in training.

The Tesseract engine has been developed for decoding documents and leverages highly a secondary dictionary classifier to determine which character is likely to be in a given position of a word helping to improve performance for close characters (0/D, 8/B, 0/O, etc.) that are typically a problem for OCR. For a LPR application, for example, the dictionary information is not readily available and as a result the performance suffers. Note that obtaining DMV (Department of Motor Vehicles) records for valid license plate character sequences to improve ALPR is highly problematic in practical implementations. Since there are problems such as poor image quality due to ambient lighting conditions, image perspective distortion, and interference characters, etc., such prior art approaches are unable to accurately recognize the license plate characters.

Based on the foregoing, it is believed that a need exists for an improved method and system for recognizing a license plate character utilizing a machine learning classifier, A need also exists for an improved method for locally preprocessing a character image utilizing a quantization transformation, as will be described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved automatic license plate recognition method and system.

It is another aspect of the disclosed embodiments to provide for an improved method and system for recognizing a license plate character utilizing a machine learning classifier.

It is yet another aspect of the disclosed embodiments to provide for an improved method for locally preprocessing a character image utilizing a quantization transformation.

The aforementioned aspects and other objectives and advantages can now be achieved as described herein. Methods and systems for recognizing a license plate character utilizing a machine learning classifier are disclosed herein. A license plate image with respect to a vehicle can be captured by an image capturing unit and the license plate image can be segmented into license plate character images. The character image can be preprocessed to remove a local background variation in the image and to define a local feature utilizing a quantization transformation (e.g., SMQT (Successive Mean Quantization Transform)). A classification margin for each character image can be identified utilizing a set of machine learning classifiers (e.g., SnoW (Sparse Network of Winnows) classifiers) each binary in nature, for the character image. Each binary classifier can be trained utilizing a character sample as a positive class, and all other characters as well as non-character images as a negative class. The character type associated with the classifier with a largest classification margin can be determined and the OCR (Optical Character Recognition) result can be declared. Note that an alternate multi-class machine learning classifer category can also be implemented.

The character images can be grouped into an image training set of each character type. The training can be performed by applying the quantization transformation and the machine learning classifiers for each training set, and each character image. The SMQT can be performed by defining a local window of operation having a set of local image regions (e.g., 3×3 pixels or 4×4 pixels). A mean value in the local image regions can be determined and a most significant bit (MSB) for each pixel in an output region can be set to 1 where gray levels in an input region are larger than the mean value. The MSB for pixels in the output region is set to 0 where the gray levels in the input region are equal to or smaller than the mean value. The next most significant bit can be defined by repeating the procedure by taking the mean of the input region pixels associated with the pixels set to 1 in the output image, similarly for those pixels set to 0. The procedure can be repeated to re-quantize the region to any bit depth required.

The local variations can be automatically removed to reveal the underlying patterns in order to efficiently manage a high dimensionality feature vector by the SMQT. By learning the underlying patterns, the SNoW machine learning classifiers with SMQT features quickly generalizes each character type, utilizing a relatively small number of training samples. The SMQT provides features that are robust to a local gain and an offset variation within the character image which enables better OCR performance on the license plates even in the presence of the license plate noises. The number of training samples required for the SNoW grows linearly with number of relevant feature elements, and only logarithmically with the total number of feature elements—thus the efficiency with large feature dimensions, and the ability to efficiently learn using a minimum number of training samples.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
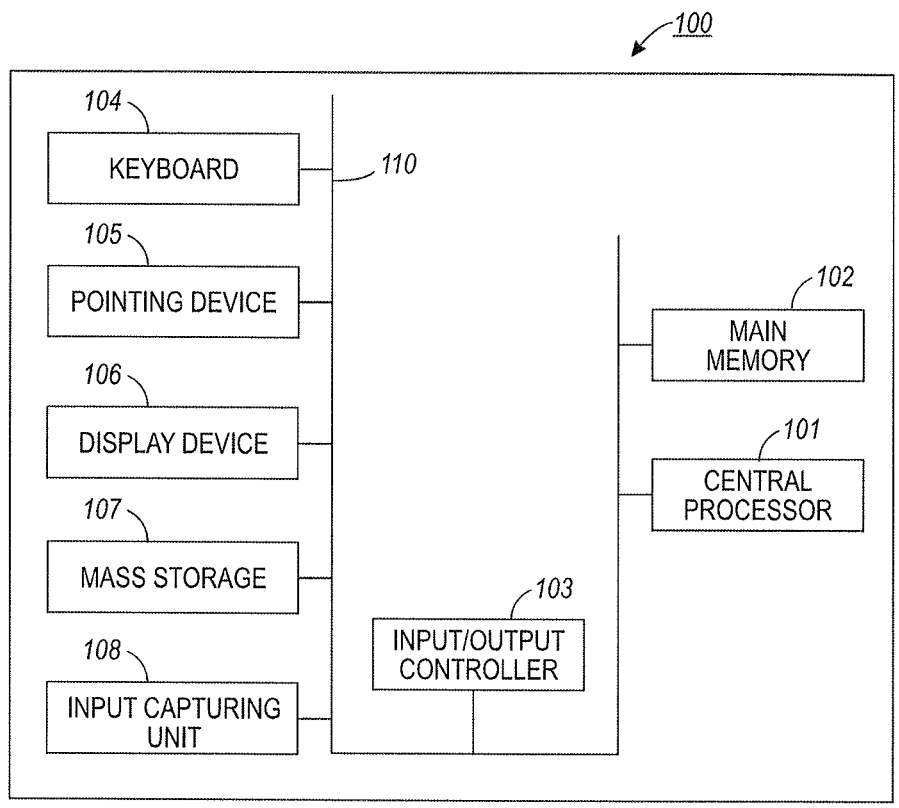
FIG. 1 illustrates a schematic view of a computer system, in accordance with the disclosed embodiments.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g. through the Internet via an internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 2:
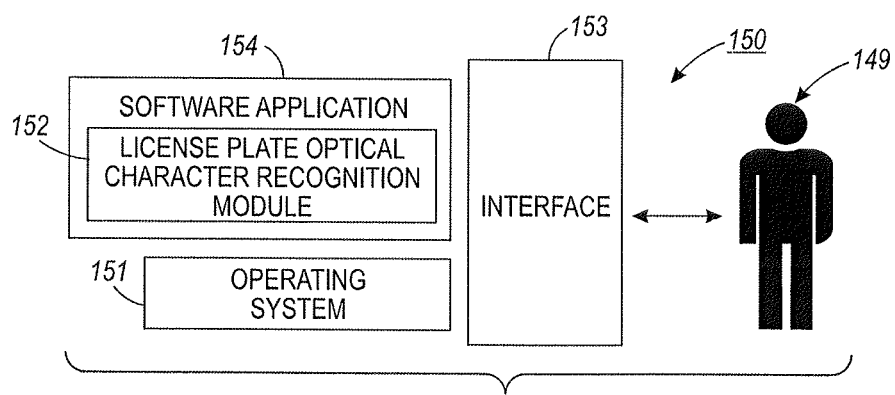
FIG. 2 illustrates a schematic view of a software system including a license plate optical character recognition module, an operating system, and a user interface, in accordance with the disclosed embodiments.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a central processor 101, a main memory 102, an input/output controller 103, a keyboard 104, an input device 105 (e.g., a pointing device such as a mouse, track ball, pen device, etc.), a display device 106, a mass storage 107 (e.g., a hard disk), and a USB (universal serial bus) peripheral connection. As illustrated, the various components of data-processing system 100 can communicate electronically through a system bus 110 or similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 154, stored in main memory 102 and on mass storage 107, generally includes a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 151 and/or software application 154.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 153, which is preferably a graphical user interface (GUI), can serve to display results, whereupon a user may supply additional inputs or terminate a particular session. In some embodiments, operating system 151 and interface 153 can be implemented in the context of a "windows" system. It can be appreciated, of course, that other types of systems are possible. For example, rather than a traditional "windows" system, other operation systems such as, for example, a real time operating system (RTAS) more commonly employed in wireless systems may also be employed with respect to operating system 151 and interface 153. The software application 154 can include, for example, a license plate optical character recognition module 152 for recognizing a license plate character utilizing a machine learning classifier and a quantization transformation. The license plate optical character recognition module 152 can include instructions such as those of methods 400 and 500 discussed herein with respect to FIGS. 5-6.

FIGS. 1-2 are thus intended as examples and not as architectural limitations of the disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, Unix, Linux, and the like.

Figure 3:
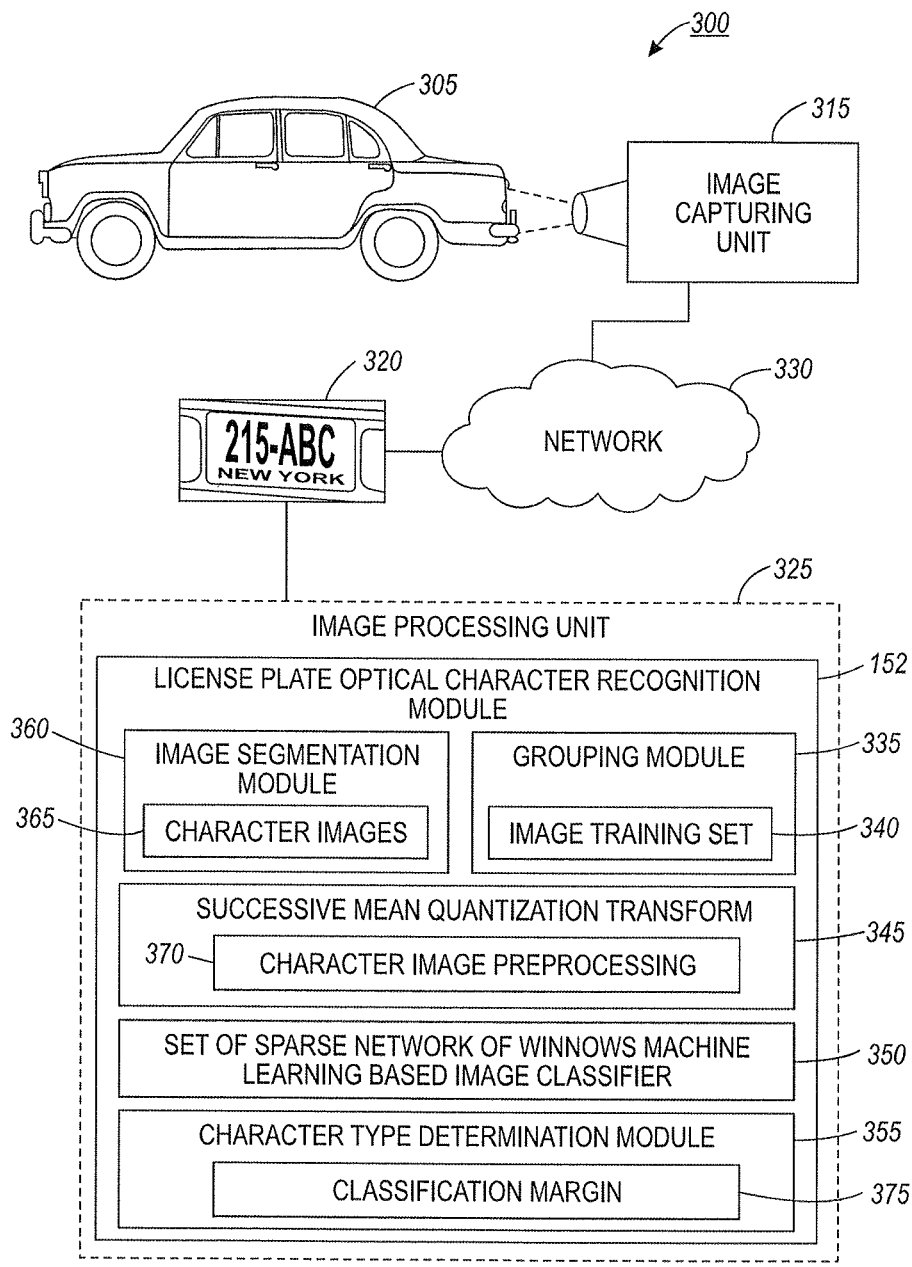
FIG. 3 illustrates a block diagram of a license plate optical character recognition system, in accordance with the disclosed embodiments.

FIG. 3 illustrates a block diagram of a license plate optical character recognition system 300, in accordance with the disclosed embodiments. Note that in FIGS. 1-9, identical or similar blocks are generally indicated by identical reference numerals. The license plate optical character recognition system 300 generally includes an image capturing unit 315 (e.g., camera) for capturing an image of a vehicle 305 within an effective field of view. The image capturing unit 315 provides an image of a license plate 320 mounted on the rear of the vehicle 305. Note that the license plate optical character recognition system 300 is capable of reading the license plate on the front of the vehicle 305 as well as the rear. The image capturing unit 315 can be operatively connected to an image processing unit 325 via a network 330.

Note that the network 330 may employ any network topology, transmission medium, or network protocol. The network 330 may include connections such as wire, wireless communication links, or fiber optic cables. Network 330 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages.

The image capturing unit 315 can be operated as a handheld device and/or a vehicle-mounted device. Note that the image capturing unit 315 described in greater detail herein are analogous or similar to the image capturing unit 108 of the data-processing system 100, depicted in FIG. 1. The image capturing unit 315 may include built-in integrated functions such as image processing, data formatting, and data compression functions. Also, the unit includes imager-positioning, range-finding, and a flash bulb.

The license plate optical character recognition system 300 further includes an image processing unit 325 to receive the captured digital image 320 from the image capturing unit 315 in order to process the image 320. The image processing unit 325 is preferably a small, handheld computer device or palmtop computer as depicted in FIG. 1 that provides portability and is adapted for easy mounting. The image processing unit 325 can be configured to include the license plate optical character recognition module 152 to accurately recognize the license plate character of the vehicle 305. The license plate optical character recognition module 152 further includes an image segmentation module 360, a grouping module 335, a successive mean quantization transformation 345, a set of sparse network of winnows machine learning based image classifier 350, and a character type determination module 355. It can be appreciated that the successive mean quantization transformation 345 and the set of sparse network of winnows machine learning based image classifier 350 can be implemented as software modules.

The image segmentation module 360 segments the license plate image 320 into license plate character images 365. The grouping module 335 groups the character images 365 into an image training set 340 of each character type. The training can be performed by applying the quantization transformation 345 and the machine learning classifiers 350 for each training set 340 and each character image 365. The character image 365 can be preprocessed to remove a local background variation in the image 365 and to define a local feature using the quantization transformation 345. Note that the quantization transformation 345 can be, for example, a SMQT (Successive Mean Quantization Transform) transformation. In general, the SMQT transform reveals the organization or structure of the data and removes properties such as gain and bias. The transform can be described and applied in speech processing and image processing.

A classification margin 375 for each character image 365 can be identified utilizing the set of machine learning classifiers 350 each binary in nature for the character image 365. Note that the machine learning classifiers 350 can be, for example, SnoW (Sparse Network of Winnows) classifiers. The SNoW machine learning classifier is a single layer neural network that employs a multiplicative weight update rule (Winnow Rule) as opposed to an additive update rule (Perceptron Rule) and mistake based supervised training. The Winnow update rule is particularly suited to learning tasks where the features are of very high dimensionality. The SNoW classifier is a linear classifier and can handle features of high dimensionality. When projected into a very high dimensional feature space, the license plate OCR system 300 can be managed by the linear classifiers 350. The SMQT machine learning classifiers 350 on the images 365 is robust to local gain and offset variations, are of very high dimensionality (for example, feature vectors that are of much higher dimensionality than the number of pixels in the image), and are well suited for the license plate OCR system 300.

The SNoW machine learning classifiers 350 with the SMQT 345 is particularly well suited to license plate OCR system 300 since it can efficiently manage high dimensionality feature vectors. Further, the SNoW classifiers 350 can be trained on-line and any training performed a priori to application can easily be augmented with training in the field. The site specific noises and image variations can be learned by the SNoW classifiers 350 without retraining the whole network from scratch. The SNoW classifiers 350 can efficiently handle high dimensionality feature sets, efficiently learn using a relatively small number of training samples, is trained on-dine, and can be further trained when deployed in the field.

Note that in a preferred embodiment, the SNoW machine learning classifiers 350 can be configured as split-up SNoW classifiers. In a split-up SNoW classifier, a separate classifier can be trained for the positive case and the negative case. For example, to classify the letter "A" one would train a positive classifier that recognizes the symbol "A" versus all other possible symbols. Likewise, one would train a "non-A" classifier that would recognize what is effectively not the symbol "A". By training both the positive and negative classifiers, two sets of SNoW weights can be obtained. The split-up SNoW classifier implementation can include taking the difference between these two sets of weights to obtain a single set of classifier weights, or parameters, which encapsulates the training knowledge obtained from both the positive and negative classifiers.

Each binary classifier 350 can be trained utilizing a character sample as a positive class and all other characters as well as non-character images as a negative class. The character type determination module 355 determines the character type associated with the classifier 350 with a largest classification margin 375 and the OCR result can be declared. The SMQT 345 possesses characteristics that are particularly suited to the license plate OCR system 300 as the local variations can be automatically removed to reveal the underlying patterns and can efficiently manage high dimensionality feature vectors. By learning the underlying patterns, the SNoW machine learning classifiers 350 with SMQT features 345 quickly generalizes each character type, using a relatively small number of training samples. Note that the embodiments discussed herein should not be construed in any limited sense. It can be appreciated that such embodiments reveal details of the structure of a preferred form necessary for a better understanding of the invention and may be subject to change by skilled persons within the scope of the invention without departing from the concept thereof.

Figure 4:
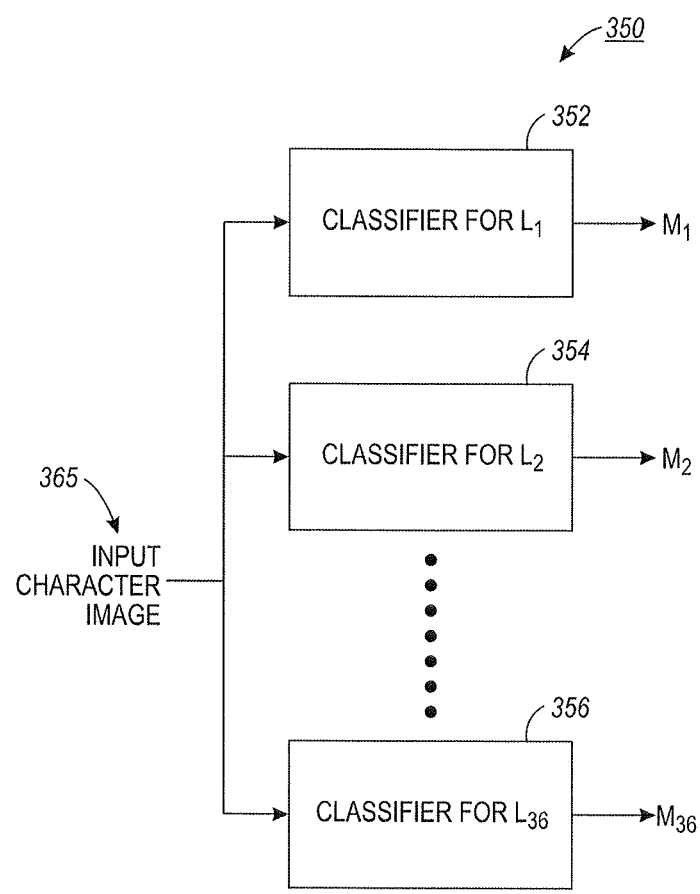
FIG. 4 illustrates a schematic block diagram of a set of machine learning classifiers, in accordance with the disclosed embodiments.

FIG. 4 illustrate a schematic block diagram of the set of machine learning classifiers 350, in accordance with the disclosed embodiments. The system 300 includes a set of 36 different SNoW-based image classifiers 352, 354, and 356 (one for each number 0-9 and letter A-Z). The binary classifiers 352, 354, and 356 each identify the classifier classification margin $M_i$, that a given test image is character $L_i$ or not character $L_i$, where i is the index of the classifier (1, 2, ... 36) and the $L_i$ values are the labels associated with each symbol in the dictionary.

By submitting the input test character 365 to each of the 36 classifiers 352, 354 up to 356, the label for the classifier with the largest classifier margin $M_i$ can be identified as the OCR result. For example, using a set of labeled sample character images, the 36 individual classifiers 352, 354, and 356 can then be trained utilizing the SNoW classifier 350 with an enforced template size of 40 rows by 20 columns (the aspect ratio for the license plate segmented characters is typically 2:1). The 36 classifiers 352, 354, and 356 can then be integrated together with logic to select the OCR output label based on the classifier with the largest margin.

Figure 5:
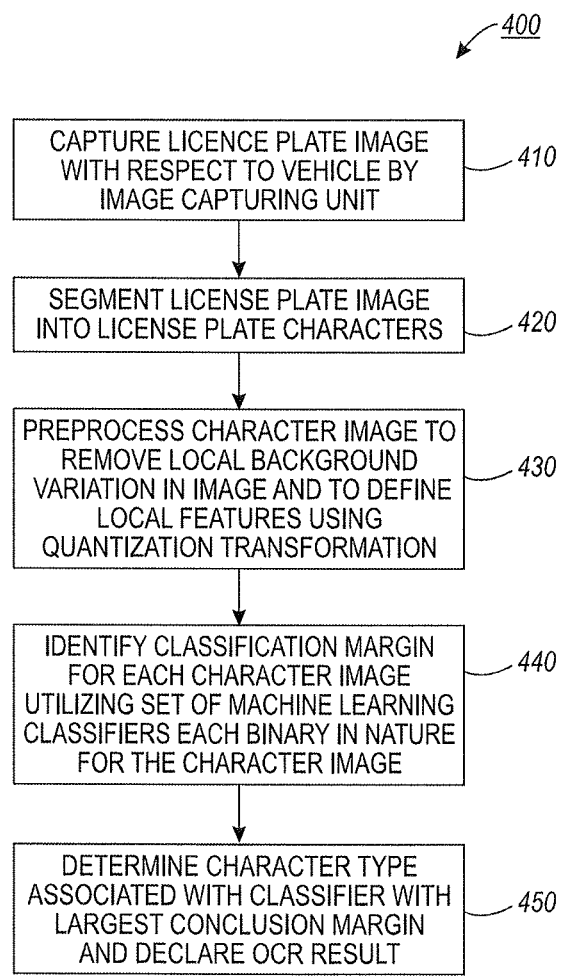
FIG. 5 illustrates a high level flow chart of operation illustrating logical operational steps of a method for recognizing a license plate character utilizing a quantization transformation and a machine learning classifier, in accordance with the disclosed embodiments.

FIG. 5 illustrates a high level flow chart of operation illustrating logical operational steps of a method 400 for recognizing the license plate characters utilizing the quantization transformation 345 and the machine learning classifier 350, in accordance with the disclosed embodiments. It can be appreciated that the logical operational steps shown in FIG. 5 can be implemented or provided via, for example, a module such as module 154 shown in FIG. 2 and can be processed via a processor such as, for example, the processor 101 shown in FIG. 1.

Initially, the image-capturing unit 315, as shown at block 410, can capture the license plate image 320 with respect to the vehicle 305. The license plate image 320 can be segmented into license plate character images 365, as indicated at block 420. The character image 365 can be preprocessed to remove the local background variation 370 in the image 365 and to define the local feature using the quantization transformation 345, as depicted at block 430. Thereafter, as shown at block 440, the classification margin 375 for each character image can be identified utilizing the set of machine learning classifiers 350 each binary in nature, for the character image 365. The character type associated with the classifier 350 with the largest classification margin 375 can be determined and the OCR result can be declared, as depicted at block 450.

Figure 6:
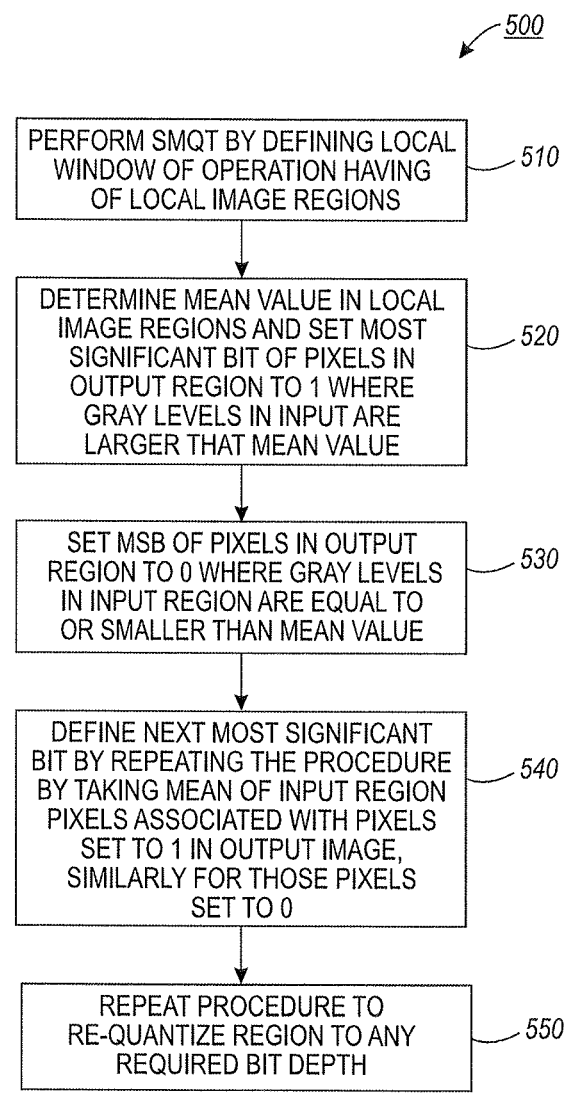
FIG. 6 illustrates a high level flow chart of operation illustrating logical operational steps of a method for preprocessing the character image utilizing the quantization transformation, in accordance with the disclosed embodiments.

FIG. 6 illustrates a high level flow chart of operation illustrating logical operational steps of a method 500 for preprocessing the character image 365 utilizing the quantization transformation 345, in accordance with the disclosed embodiments. Initially, the SMQT 345 can be performed by defining a local window of operation having a set of local image regions (3×3 pixels or 4×4 pixels), as shown at block 510. The mean value in the local image regions can be determined and a most significant bit (MSB) of the pixels in an output region can be set to 1 where in the input region the gray levels are larger than the mean value, as indicated at block 520. The MSB of pixels in the output region is set to 0 where in the input region the gray levels are equal to or smaller than the mean value, as depicted at block 530. Thereafter, as illustrated at block 540, the next most significant bit can be defined by repeating the procedure by taking the mean of the input region pixels associated with the pixels set equal to 1 in the output image, similarly for those pixels set equal to 0. The procedure can be repeated to re-quantize the region to any bit depth required, as indicated at block 550.

Figure 7:
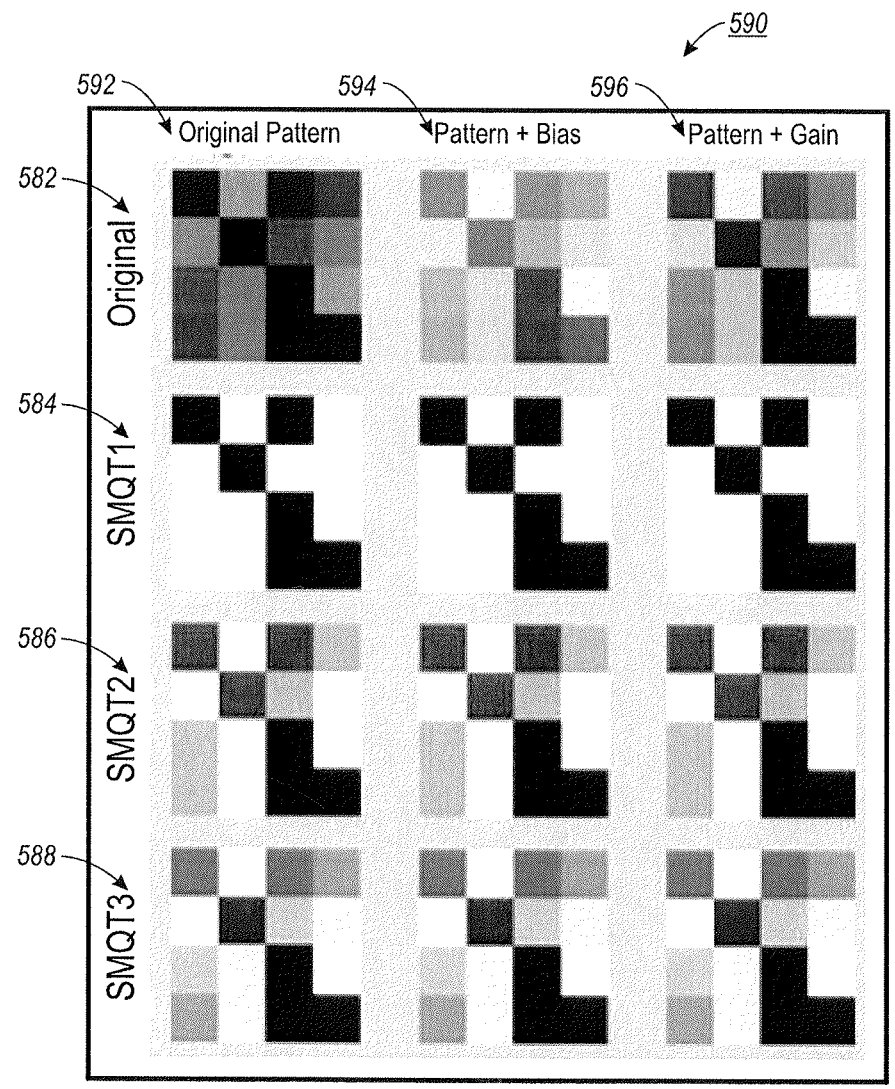
FIG. 7 illustrates a schematic view of a local window of operation having a set of local image regions, in accordance with the disclosed embodiments.

FIG. 7 illustrates a schematic view of a local window of operation having a set of local image regions 590, in accordance with the disclosed embodiments. The top row of images depicts, in an upper left region 592 a original 4×4 region of interest at 256 levels of gray, in an upper middle image 594 the original image distorted by a local offset variation, and an upper right image 596 shows the original image distorted by a local gain variation.

Note that the underlying image pattern is the same in all three images on the upper row 582, the middle and right image being distorted by local variations of the type often seen in license plate images. The images on the second row 584 show the output of a 1-level SMQT procedure 345 performed on each image above which results in binary images. Note that the binary images on the second row 584 are all the same image. Even though the input to the SMQT 345 (the images directly above) is different (middle one with an local offset and the right one with a local gain) in each case, the same output pattern can be recovered.

Note that the particular local gain and local offset that are removed in the 4×4 local region does not have to be the same local gain and local offset to be removed in another 4×4 local region. Each local 4×4 region can have a different local gain and local offset removed so as to reveal a local gain and local offset independent pattern, which is then used to define a feature for the machine learning classifier. The SMQT procedure 345 possesses characteristics that are particularly suited to license plate OCR system 300, since local variations are automatically removed to reveal the underlying patterns. The third row 586 and the fourth row 588 depict 4 level and 8 level re-quantization (rather than the binary re-quantization shown in row 2) and also display robustness to local gain and local offset and can be used if machine learning features with greater bit depth are required in the classification procedure. By learning the underlying patterns, the SNoW classifier 350 with SMQT features 345 quickly generalizes each character type, using a relatively small number of training samples.

Figure 8:
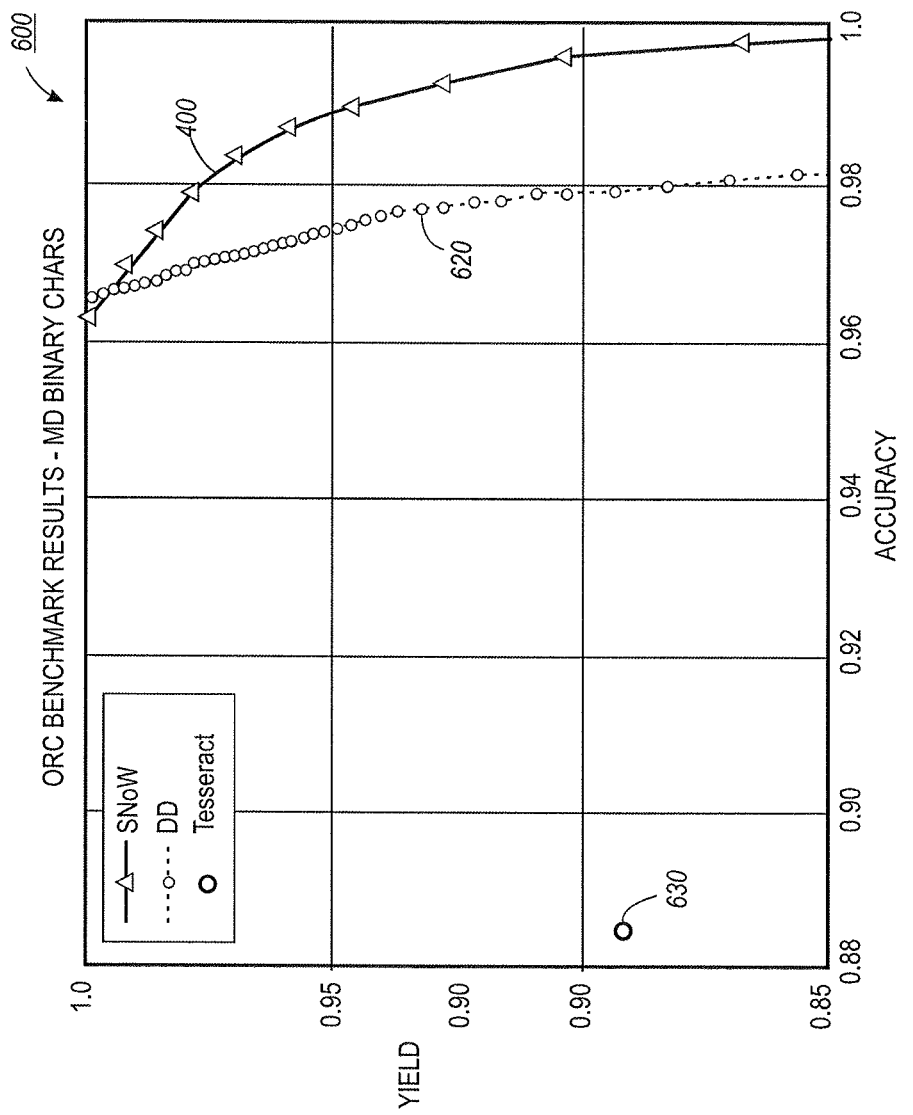
FIG. 8 illustrates a graph depicting data indicative of the performance improvement of the SNoW based optical character recognition, in accordance with the disclosed embodiments.

FIG. 8 illustrates a graph 600 depicting data indicative of the performance improvement of the SnoW based optical character recognition method 400, in accordance with the disclosed embodiments. FIG. 8 illustrates a yield-accuracy curve of two different OCR technologies, for example, Tesseract 630 and data driven 620 compared with the SNoW based OCR method 400. Yield is the percentage of total opportunities where a decision is made. Accuracy is the percentage of correct decisions made out of the total number of decisions made. The yield-accuracy curve is similar to a ROC (Receiver Operating Characteristics) curve in that it represents a design trade off. The yield-accuracy curve can be employed, for example, to compare two algorithms by looking at, say, the accuracy achieved at a yield of 95%, that is, the percentage of mistakes made when making a decision on 95% of all license plates seen (or all characters seen, depending on how the curve is defined). The SNoW based OCR method 400 possess several key advantages over the prior OCR techniques 620 and 630 when applied to license plate characters.

Figure 9:
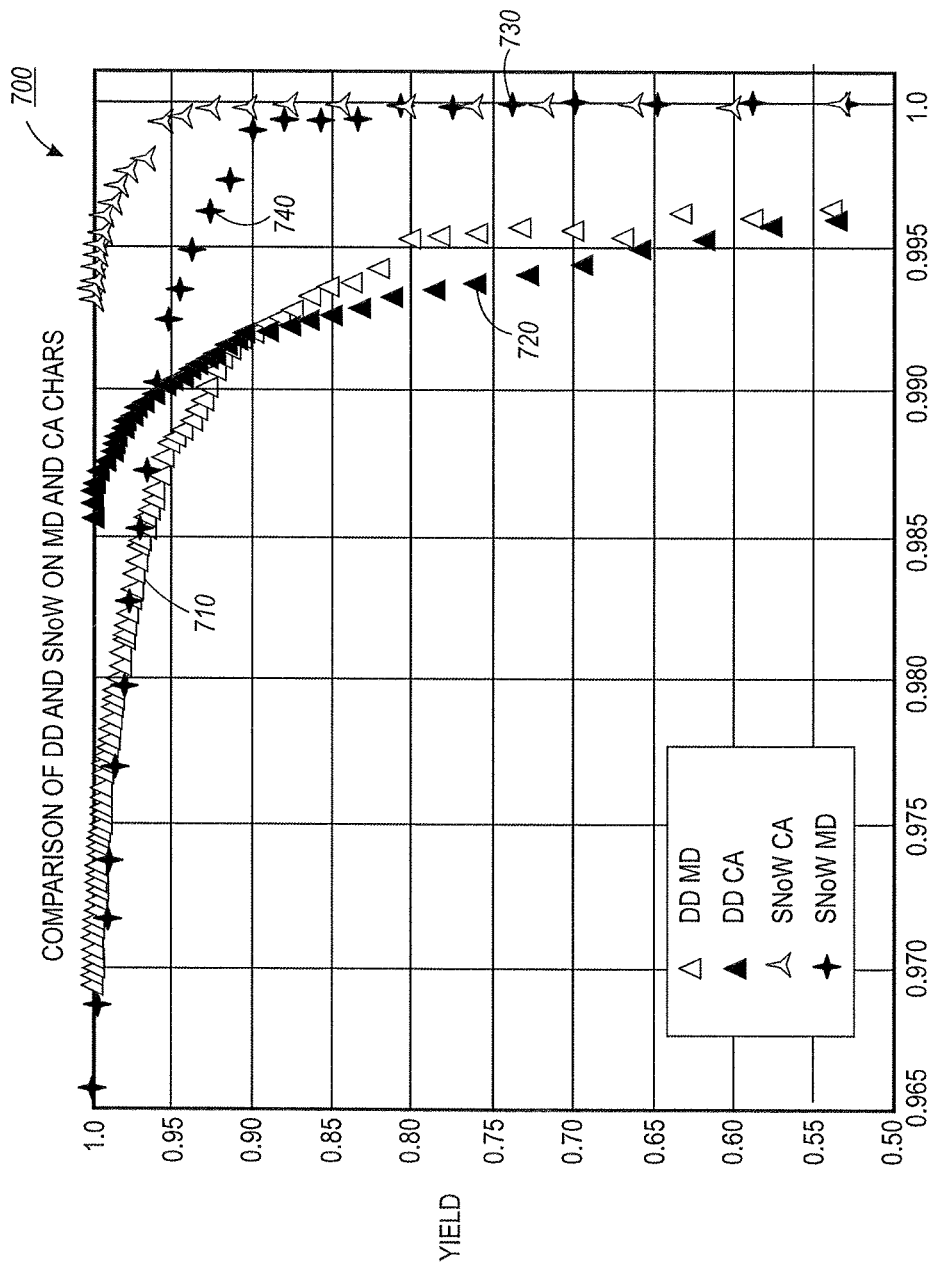
FIG. 9 illustrates a graph depicting data indicative of the performance improvement of the SNoW based optical character recognition, in accordance with the disclosed embodiments.

FIG. 9 illustrates a graph 700 depicting data indicative of the performance improvement of the SnoW based optical character recognition method 400, in accordance with the disclosed embodiments. FIG. 9 depicts the results comparing the SNoW based OCR method 400 with the data-driven OCR 710 and 720 using two different data sets: one for Maryland license plate characters and one for California license plate characters (since the font is different between the two states). The plots can be generated by sweeping a minimum classifier margin required to generate a conclusive result. For example, any input test characters for which the maximum classifier margin failed to exceed the specified threshold are considered inconclusive (and so only penalized yield rather than accuracy). This is a standard technique for identifying the desired classifier parameters for operation. FIG. 9 indicates a significant yield/accuracy performance improvement for a SNoW based OCR engine 730 and 740 versus the data-driven OCR 710 and 720 for both the Maryland and California data sets. In addition to the yield/accuracy improvement, the SNoW based OCR engine 730 and 740 also exhibits approximately a 4× reduction in per character processing time for the OCR step. Since overall throughput is a key performance metric for ALPR systems, this efficiency improvement is also significant.

The SMQT 345 provides features that are robust to local gain and offset variations within the character images 365.

The robustness to gain and offset enables better OCR performance on the license plate even in the presence of license plate noises. The number of training samples required for the SNoW 350 grows linearly with number of relevant feature elements, and only logarithmically with the total number of feature elements, thus the efficiency with large feature dimensions, and the ability to efficiently learn using a minimum number of training samples.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for recognizing a license plate character, said method comprising:
   capturing a license plate image with respect to a vehicle utilizing an image capturing unit and thereafter segmenting said license plate image into a license plate character image;
   pre-processing said license plate character image to remove a local background variation with respect to said license plate character image and to define a local feature thereof utilizing a quantization transformation; and
   identifying a classification margin for each character image utilizing a set of machine learning classifiers each binary in nature for said character image in order to thereafter determine a character type associated with at least one machine learning classifier among said set of machine learning classifiers with a largest classification margin to declare an optical character recognition result.

2. The method of claim 1 further comprising utilizing a multi-class machine learning classifier instead of said set of machine learning classifiers in order to declare said optical character recognition result.

3. The method of claim 1 further comprising training each binary classifier utilizing a character sample as a positive class and other characters as well as non-character images as a negative class.

4. The method of claim 1 further comprising:
   grouping said license plate character image into an image training set of each character type; and
   performing training by applying said quantization transformation and said set of machine learning classifiers for each training set and each character image.

5. The method of claim 1 wherein said quantization transformation comprises a successive mean quantization transformation.

6. The method of claim 1 wherein said set of machine learning classifiers comprises a set of sparse network of winnows machine based image classifiers.

7. The method of dam 1 wherein said set of machine learning classifiers comprises a set of split up sparse network of winnows machine learning image classifiers.

8. The method of claim 1 wherein defining said local feature utilizing said quantization transformation, further comprises:
   defining a local window of operation having a plurality of local image regions and determining a mean value in said plurality of local image regions;
   setting a most significant bit of each pixel in an output region to 1 wherein a gray level with respect to an input region is larger than a mean value; and
   setting said most significant bit of each pixel in said output region to 0 wherein said gray level with respect to said input region is equal to and/or smaller than said mean value.

9. The method of claim 6 further comprising:
   defining a next most significant bit by repeating said procedure by taking said mean value of said input region pixel associated with said pixel set to 1 in said output image and similarly for said pixel set to 0; and
   repeating said procedure to re-quantize said local image regions to any required bit depth.

10. The method of claim 1 further comprising automatically removing said local background variation to reveal an underlying pattern by said quantization transformation to efficiently manage a high dimensionality feature vector.

11. A system for recognizing a license plate character, said system comprising:
    a processor; and
    a computer-usable medium embodying computer code, said computer-usable medium being coupled to said data bus, said computer program code comprising instructions executable by said processor and configured for:
      capturing a license plate image with respect to a vehicle utilizing an image capturing unit and thereafter segmenting said license plate image into a license plate character image;
      pre-processing said license plate character image to remove a local background variation with respect to said license plate character image and to define a local feature thereof utilizing a quantization transformation; and
      identifying a classification margin for each character image utilizing a set of machine learning classifiers each binary in nature for said character image in order to thereafter determine a character type associated with at least one machine learning classifier among said set of machine learning classifiers with a largest classification margin to declare an optical character recognition result.

12. The system of claim 11 wherein said instructions are further configured for utilizing a multi-class machine learning classifier instead of said set of machine learning classifiers in order to declare said optical character recognition result.

13. The system of claim 11 wherein said instructions are further configured for training each binary classifier utilizing a character sample as a positive class and other characters as well as non-character images as a negative class.

14. The system of claim 11 wherein said instructions are further configured for:
    grouping said license plate character image into an image training set of each character type; and
    performing training by applying said quantization transformation and said set of machine learning classifiers for each training set and each character image.

15. The system of claim 11 wherein said quantization transformation comprises a successive mean quantization transformation.

16. The system of claim 11 wherein said set of machine learning classifiers comprises a set of sparse network of winnows machine based image classifiers.

17. The system of claim 11 wherein said set of machine learning classifiers comprises a set of split up sparse network of winnows machine learning image classifiers.

18. A non-transitory processor-readable medium storing code representing instructions to cause a processor to perform a process to recognize a license plate character, said code comprising code to: capture a license plate image with respect to a vehicle utilizing an image-capturing unit and thereafter segmenting said license plate image into a license plate character image; pre-process said license plate character image to remove a local background variation with respect to said license plate character image and to define a local feature thereof utilizing a quantization transformation; and identify a classification margin for each character image utilizing a set of machine learning classifiers each binary in nature for said character image in order to thereafter determine a character type associated with at least one machine learning classifier among said set of machine learning classifiers with a largest classification margin to declare an optical character recognition result.

19. The non-transitory processor-readable medium of claim 18 wherein said code further comprises code to utilize a multi-class machine learning classifier instead of said set of machine learning classifiers in order to declare said optical character recognition result.

20. The non-transitory processor-readable medium of claim 18 wherein said set of machine learning classifiers comprises a set of split up sparse network of machine learning image classifiers.

\* \* \* \* \*